United States Patent [19]
Kaziwara

[11] Patent Number: 5,391,927
[45] Date of Patent: Feb. 21, 1995

[54] APPARATUS FOR IMPROVING RISE CHARACTERISTICS OF DIRECT CURRENT POWER SUPPLY

[75] Inventor: Shinzi Kaziwara, Kawasaki, Japan

[73] Assignee: Fujitsu Limited, Japan

[21] Appl. No.: 943,399

[22] Filed: Sep. 10, 1992

[30] Foreign Application Priority Data

Sep. 13, 1991 [JP] Japan .................... 3-234631

[51] Int. Cl.$^6$ ............................................... H02J 7/00
[52] U.S. Cl. ........................................ 307/66; 363/49; 323/901
[58] Field of Search ................ 307/66, 64, 46, 85–87, 307/74–75; 361/154; 363/49; 323/901

[56] References Cited

U.S. PATENT DOCUMENTS 4,544,910 9/1985 Hoberman ........................... 340/333
4,672,293 6/1987 Crampton ........................... 320/14

FOREIGN PATENT DOCUMENTS 5245601 11/1977 Japan .
1160332 6/1989 Japan .
37031 1/1991 Japan .

Primary Examiner—A. D. Pellinen
Assistant Examiner—Aditya Krishnan
Attorney, Agent, or Firm—Greer, Burns & Crain, Ltd.

[57] ABSTRACT

If a rectifier having Walk-in characteristics is directly connected to a dc-dc converter, an output current of the rectifier violently fluctuates because of the Walk-in characteristics of the rectifier. The Walk-in characteristics have been improved by connecting an apparatus in parallel with the rectifier. The apparatus includes a storage battery and a switch. During the Walk-in period, the switch is closed and the storage battery supplements the capacity of the rectifier. After that, the switch is opened and the storage battery is charged by a current flowing through a diode and a resistor.

4 Claims, 3 Drawing Sheets

APPARATUS FOR IMPROVING RISE CHARACTERISTICS OF DIRECT CURRENT POWER SUPPLY

BACKGROUND OF THE INVENTION

1. Field of the Invention

The present invention relates to an apparatus for improving rise characteristics of a direct current power supply source in order to supply a load with a direct current having efficient rise characteristics, even when a direct current power supply having "Walk-in" characteristics, wherein a capacity for supplying power gradually increases after starting and reaches a rated value after more than several seconds, is used.

2. Description of the Related Art

In equipment such as communication facilities, power is fed in the form of a direct current to each unit. The direct current is usually obtained by rectifying an alternating current such as commercial power, with a rectifier.

Among such kinds of rectifiers, there is one that cannot supply maximum rated power immediately after starting but reaches the rated power after several to several tens of seconds have elapsed. The reason why the rectifier is given such a characteristic is that a generator generating an alternating current fed to the rectifier is in danger of stalling if the generator is over-loaded immediately after starting, and thus, that danger must be avoided. This characteristic of rectifiers is called a "Walk-in" characteristic.

On the other hand, on a load side, though various load states are supposed, in a general case, the load is often an electronic circuit including a power supply board. In the case of the power supply board as an example, a circuit construction including a dc-dc converter is widely employed in general power supply boards. A power supply board having a circuit construction including a dc-dc converter usually has rise characteristics such that circuits do not operate while an input current is below a certain threshold value, and normally operate if the input current is above the threshold value.

If the dc-dc converter having such rise characteristics is directly connected to the aforesaid rectifier, an output current of the rectifier violently fluctuates as discussed later. In the case of communication facilities, the violent fluctuation of the output current of the rectifier causes communication errors or generation of alarm transmission, or in a worst case, causes a breakdown of the facilities.

SUMMARY OF THE INVENTION

It is an object of the present invention to provide an apparatus for improving rise characteristics of a direct current power supply, that can supply loads with a direct current with efficient rise characteristics even when a direct current power supply having the aforesaid Walk-in characteristics is used.

In accordance with the present invention, there is provided an apparatus for improving rise characteristics of a direct current power supply that cannot provide a rated power after starting operating, to thereby supply a load with a direct current having improved rise characteristics, comprising:

a storage battery;

a switch serially connected to the storage battery so that the storage battery is connected to the direct current power supply in parallel while the switch is closed;

a current limiting circuit connected to the switch in parallel, for limiting an amount and a direction of a current flowing between the direct current power supply and the storage battery while the switch is opened.

DESCRIPTION OF THE REFERRED EMBODIMENTS

Figure 1:
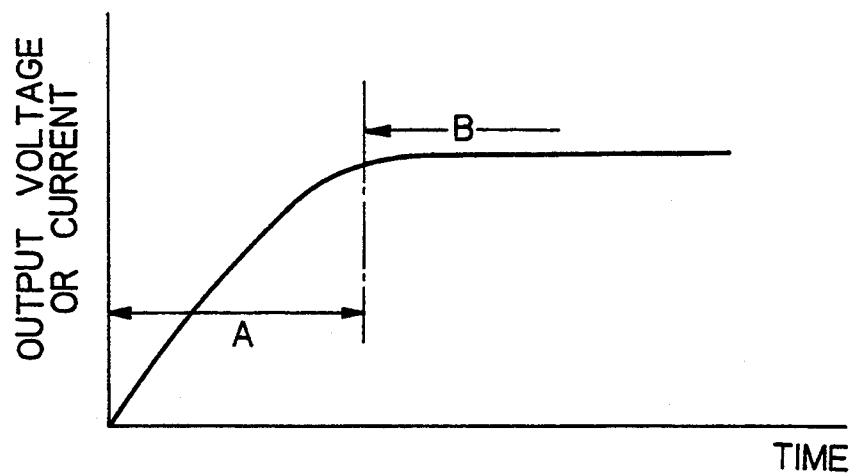
FIG. 1 is a graph showing Walk-in characteristics of a rectifier.

FIG. 1 shows Walk-in characteristics of a rectifier. As shown in FIG. 1, an output current or current of the rectifier having the Walk-in characteristics gradually rises in a Current-Walk-in period denoted by a character A, and maximum rated output is obtained in a range B after the Walk-in period ends.

Figure 2:
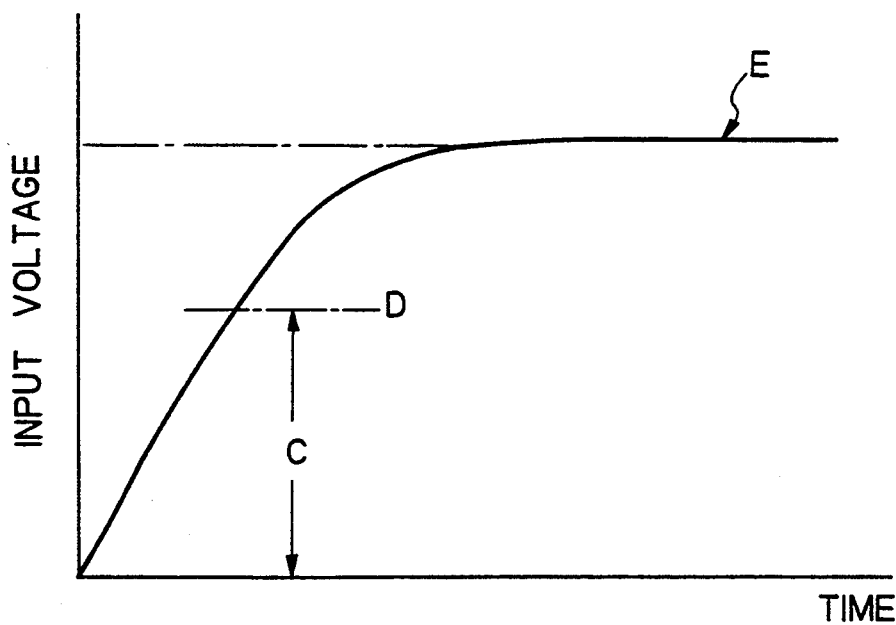
FIG. 2 is a graph for explaining rise characteristics of a dc-dc converter.

FIG. 2 shows rise characteristics of dc-dc converter included in a power supply board. In FIG. 2, the dc-dc converter does not operate in an interval C wherein an input current is below a threshold value D. A character E denotes a current level during normal operation.

Figure 3:
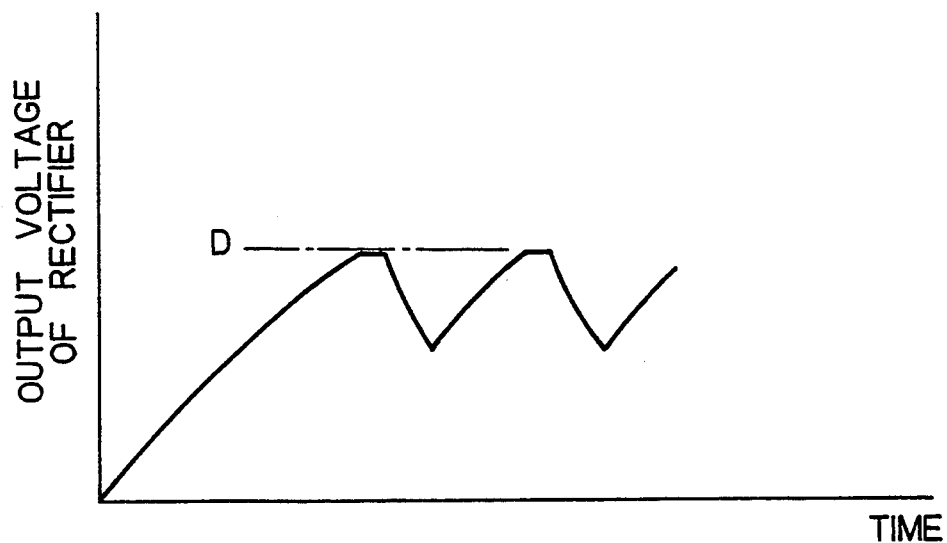
FIG. 3 is a graph showing a problem caused by the Walk-in characteristics of the rectifier.

If the dc-dc converter having the characteristics shown in FIG. 2 is directly connected to the rectifier having the rise characteristics shown in FIG. 1, the output current of the rectifier starts rising from zero level, as shown in FIG. 3. When the output current reaches the threshold value D, the dc-dc converter starts operating. As the dc-dc converter operates, the dc-dc converter requires the rectifier to feed more energy than its capacity at that time, and therefore, the output current rapidly falls because of over-loading, as shown in FIG. 3.

As the output current falls, the dc-dc converter stops operating. As the dc-dc converter stops operating, the output current of the rectifier again rises because the load becomes light. When the output current reaches the threshold value D, the dc-dc converter starts operating, and repeats the above process.

In the case of communication facilities, the above current fluctuation causes communication errors or generation of alarm transmission, or in a worst case, causes breakdown of the facilities.

Figure 4:
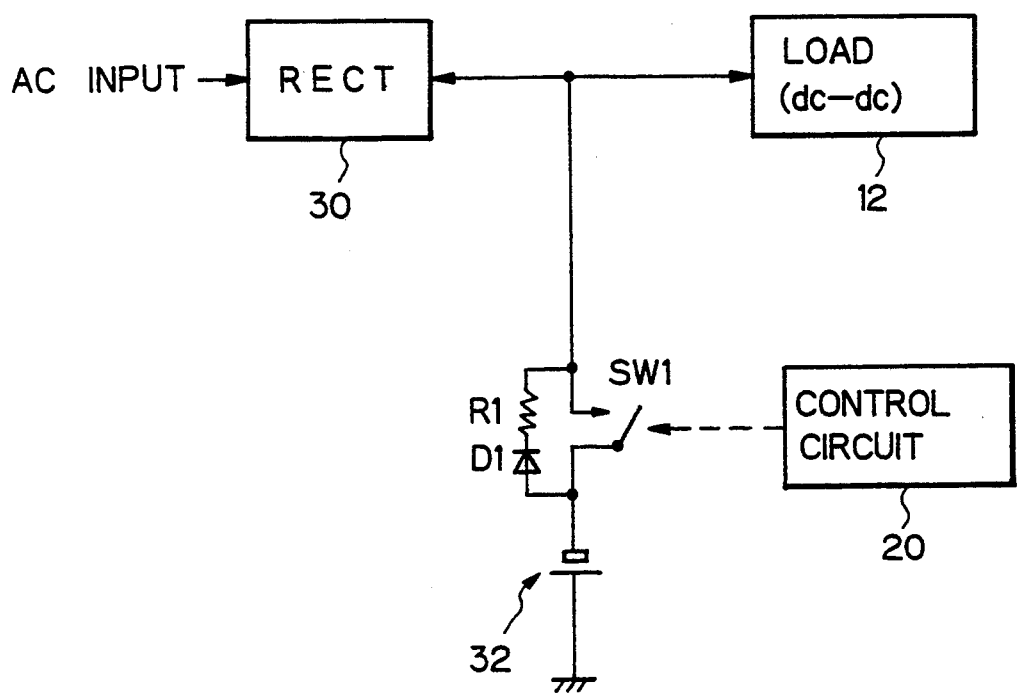
FIG. 4 is a circuit diagram showing a construction of an apparatus according to the present invention.

FIG. 4 shows an apparatus for improving rise characteristics of a direct current power supply according to the present invention.

The apparatus is connected in parallel with a rectifier 30 rectifying an ac current as a direct current power supply and with a load 12 including a dc-dc converter. The apparatus includes a storage battery 32 connected through a switch SW1 to the rectifier 30 and the load 12 in parallel. A current limiting circuit consisting of serially connected resistor R1 and diode D1 is provided in parallel with the switch SW1. The resistor R1 limits an amount of current and the diode D1 limits a direction of the current.

A control circuit 20 includes, for example, a timer. The control circuit 20 closes the switch SW1 during a period covering the Current-Walk-in period A (FIG. 1) of the rectifier 30 immediately after the rectifier starts operating. This state is shown in FIG. 5A.

Figure 5A:
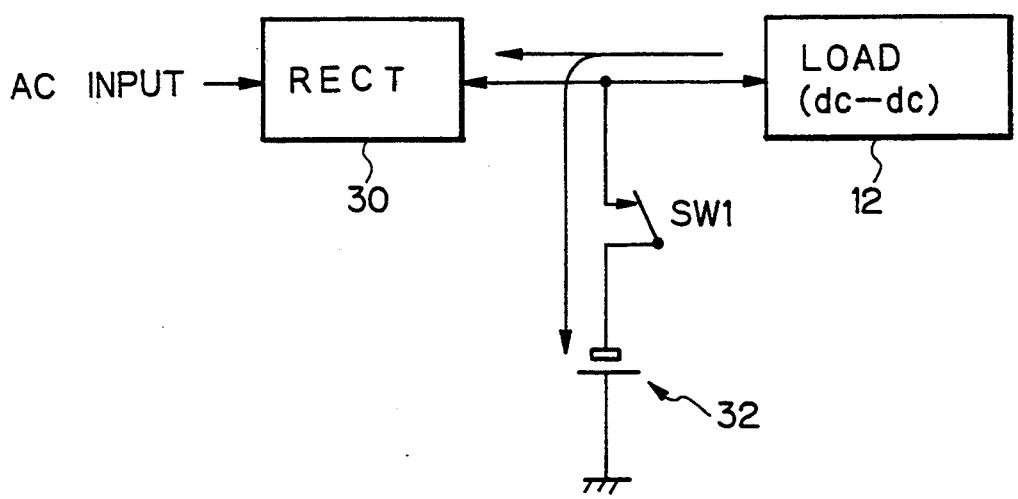
FIG. 5A and 5B are circuit diagrams for explaining operations of the apparatus of FIG. 4.

As shown in FIG. 5A, the storage battery 32 supplements the capacity of the rectifier 30 falling into a Walk-in state by feeding complementary energy through the switch SW1 to the load 12, so that a stable direct current is fed to the load 12 even during the Current-Walk-in period.

Figure 5B:
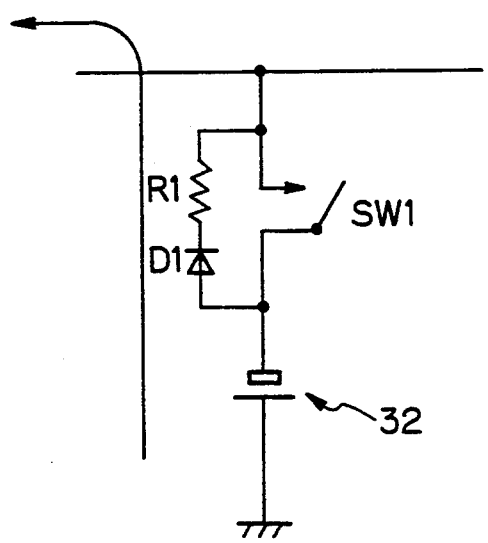

After the period ends, the control circuit 20 opens the switch SW1 as shown in FIG. 5B. Since the output current of the rectifier 30 reaches its maximum rated value by then, the load 12 does not need energy from the storage battery 32. In addition, as shown in FIG. 5B, the storage battery 32 is charged by a current limited by the resistor R1 and the diode D1, for preparing for the next Walk-in period.

I claim:

1. An apparatus for improving rise characteristics of a direct current power supply that cannot immediately provide a rated power after starting operating, to thereby supply a load with a direct current having improved rise characteristics, comprising:

a storage battery;
   a switch serially connected to said storage battery so that said storage battery is connected to the direct current power supply in parallel while the switch is closed and the direct current power supply to the load is supplemented by said storage battery;
   a current limiting circuit connected to the switch in parallel, for limiting an amount and a direction of a current flowing between the direct current power supply and the storage battery so that the load is exclusively supplied by the direct current power supply while the switch is opened.

2. An apparatus as claimed in claim 1, further comprising,
   a control circuit for closing the switch at least during a Walk-in period, and for opening the switch after that.

3. An apparatus as claimed in claim 1, wherein the current limiting circuit includes serial connection of a diode limiting the direction and a resistor limiting the amount.

4. An apparatus as claimed in claim 2, wherein the current limiting circuit includes serial connection of a diode limiting the direction and a resistor limiting the amount.

* * * * *